United States Patent
Hwang et al.

(10) Patent No.: US 9,574,915 B1
(45) Date of Patent: Feb. 21, 2017

(54) PRECISION CALIBRATION METHOD FOR HIGH-PRECISE ROTARY ENCODER

(71) Applicant: National Chung-Shan Institute of Science & Technology, Taoyuan (TW)

(72) Inventors: Yi-Yuh Hwang, Taipei (TW); Wei-Kuo Chang, Taoyuan (TW)

(73) Assignee: National Chung-Shan Institute of Science & Technology (TW)

( * ) Notice: Subject to any disclaimer, the term of this patent is extended or adjusted under 35 U.S.C. 154(b) by 0 days.

(21) Appl. No.: 14/977,636

(22) Filed: Dec. 22, 2015

(51) Int. Cl.
  *G01D 5/34* (2006.01)
  *G01D 18/00* (2006.01)
  *G01D 5/347* (2006.01)
  *G01B 11/16* (2006.01)

(52) U.S. Cl.
  CPC ............ *G01D 18/00* (2013.01); *G01D 5/3473* (2013.01); *G01B 11/162* (2013.01); *G01D 5/34* (2013.01)

(58) Field of Classification Search
  CPC ........ G01D 5/3473; G01D 5/34; G01D 18/00; G01B 21/042; G01B 11/162
  USPC .................................................... 250/231.13
  See application file for complete search history.

(56) References Cited

U.S. PATENT DOCUMENTS

| | | | | |
|---|---|---|---|---|
| 6,248,994 B1* | 6/2001 | Rose | ................... | G01B 11/162 250/231.13 |
| 6,642,506 B1* | 11/2003 | Nahum | ................... | G01B 3/205 250/231.13 |
| 7,777,879 B2* | 8/2010 | Baxter | ................... | G01D 5/3473 356/364 |
| 2007/0247636 A1* | 10/2007 | Matsuoka | ................... | G01P 3/36 356/498 |

* cited by examiner

*Primary Examiner* — Mark R Gaworecki
*Assistant Examiner* — Kenneth J Malkowski
(74) *Attorney, Agent, or Firm* — Roger H. Chu

(57) ABSTRACT

The present invention mainly provides a precision calibration method for being applied in a high-precise rotary encoder system, wherein the primary technology feature of the precision calibration method is that: using a laser speckle image capturing module to capture N frames of laser speckle image from an optical position surface of a rotary encoding body, and then using image comparison libraries and particularly-designed mathematical equations to calculate N number of displacement vectors based on the N frames of laser speckle image, so as to eventually calculate N number of angle coordinates corresponding to the N frames of laser speckle image based on the plurality of displacement vectors. Moreover, a rotation matrix is further proposed and used in this precision calibration method, and used for treating the displacement vectors with a displacement vector transforming process in order to effectively enhance the position precision of the high-precise rotary encoder system.

10 Claims, 15 Drawing Sheets

S01: providing the high-precise rotary encoder system comprising a rotary encoding body having an optical position surface, a laser speckle image capturing module having a 2D image sensor, and a controlling and processing module; wherein the rotary encoding body is connected to a center rotary shaft of a work equipment, and a precision calibration angle being included between the horizontal axis of the 2D image sensor and the horizontal axis of the rotary encoding body S02: making the rotary encoding body continuously rotate by a constant small angle until the rotary encoding body rotates a full circle, and using the laser speckle image capturing module to treat a laser speckle image capturing process to the optical position surface during the rotation of the rotary encoding body, so as to obtain N frames of laser speckle image from the optical position surface and then store the N frames of laser speckle image in a data base of the controlling and processing module

PRECISION CALIBRATION METHOD FOR HIGH-PRECISE ROTARY ENCODER

BACKGROUND OF THE INVENTION

1. Field of the Invention

The present invention relates to the technology field of angle encoders, and more particularly to a precision calibration method for high-precise rotary encoder.

2. Description of the Prior Art

During Second World War, magnetic angle encoders are developed and applied in tanks for facilitating the gun turret of the tank able to rotate by a precise angle under any harsh environments. Furthermore, with the development of science and technology, optical angle encoders are subsequently proposed.

Recently, the angle encoders have been fully developed. Please refer to FIG. 1, which illustrates a schematic framework view of an absolute positioning circular grating. As shown in FIG. 1, the absolute positioning circular grating 1' is developed and proposed by HEIDENHAIN and mainly consists of an inner annular grating 11' and an outer annular grating 12'. In which, the outer annular grating 12' and the inner annular grating 11' are designed to an equal spacing grating and an unequal spacing grating, respectively. Thus, by such grating arrangement, the absolute positioning circular grating 1' is able to carry out a precise and absolute angle coordinate with the use of multiple optical sensors.

Continuously referring to FIG. 2, where an arrangement diagram of the multiple optical sensors is shown. As shown in FIG. 2, eight equal angle position sensors 21' are respectively disposed at the positions of eight circular points, and eight unequal angle position sensors 22' are respectively disposed at the positions of eight triangular points. By such arrangement, when the absolute positioning circular grating 1' is rotated by a constant speed, the angle position information of the outer annular grating 12' and the inner annular grating 11' would be accessed by the equal angle position sensors 21' and the unequal angle position sensors 22', such that the precise and absolute angle coordinate of the absolute positioning circular grating 1' can be carried out after a complex cross-matching and calculation for the angle position information of the outer annular grating 12' and the inner annular grating 11' is completed.

Circular angle encoder having barcode proposed by ReniShaw is another optical angle encoder having been widely applied. Please refer to FIG. 3, which illustrates a schematic framework view of the circular angle encoder proposed by ReniShaw. As shown in FIG. 3, a barcode 22" consisting of a plurality of bright and dark patterns is formed on the circumferential surface 21" of circular angle encoder 2". Therefore, after accessing the bright and dark patterns of the barcode 22", it is able to obtain a high-precise angle coordinate of the circular angle coder 2" through graphical comparison.

Although the absolute positioning circular grating 1' developed by HEIDENHAIN and the circular angle encoder 2" proposed by ReniShaw has been widely applied, inventors of the present invention find that these two angel encoders still include following drawbacks and shortcomings:

(1) As FIG. 1 shows, because the inner annular grating 11' and the outer annular grating 12' are formed on a circular disk by using tool machining, it is able to know that the absolute positioning circular grating 1' naturally includes the drawback of graduation error. On the other hand, when the said absolute positioning circular grating 1' is connected to the center rotary shaft of a work equipment for practical application, the drawbacks of scanning error and eccentric error would be produced after the absolute positioning circular grating 1' has been long-term used. Wherein the scanning error is resulted from the dirty and/or damages of the inner annular grating 11' and the outer annular grating 12', and the long-term rotating friction between the circular disk of the absolute positioning circular grating 1' and the center rotary shaft of the work equipment causes the production of the eccentric error.

(2) As FIG. 3 shows, since the barcode 22' consisting of bright and dark patterns are formed on the circumferential surface 21" of the circular angle encoder 2" through tool machining or etching process, it is able to know that the circular angle encoder 2" also naturally includes the drawback of graduation error. Moreover, when the said circular angle encoder 2" is connected to the center rotary shaft of a work equipment for practical application, the drawbacks of scanning error and eccentric error would be produced after the circular angle encoder 2" has been long-term used. Wherein the scanning error is resulted from the dirty and/or damages of the barcode 22", and the long-term rotating friction between the circular angle encoder 2" and the center rotary shaft of the work equipment causes the production of the eccentric error.

Accordingly, in view of the absolute positioning circular grating 1' developed by HEIDENHAIN and the circular angle encoder 2" proposed by ReniShaw reveal many practically-used drawbacks, the inventor of the present application has made great efforts to make inventive research thereon and eventually provided a precision calibration method for high-precise rotary encoder.

SUMMARY OF THE INVENTION

The primary objective of the present invention is to provide a precision calibration method for being applied in a high-precise rotary encoder system, wherein the primary technology feature of the precision calibration method is that: using a laser speckle image capturing module to capture N frames of laser speckle image from an optical position surface of a rotary encoding body, and then using image comparison libraries and particularly-designed mathematical equations to calculate N number of displacement vectors based on the N frames of laser speckle image, so as to eventually calculate N number of angle coordinates corresponding to the N frames of laser speckle image based on the plurality of displacement vectors. Moreover, a $\alpha$ rotation matrix is further proposed and used in this precision calibration method, and used for treating the displacement vectors with a displacement vector transforming process in order to effectively enhance the position precision of the high-precise rotary encoder system. Furthermore, in this precision calibration method, an average rotation radius is measured for calculating included angles between each of two displacement vectors though vector inner product equation, such that the obtained included angle are taken as N number of after-compensation angle coordinates. Thus, by way of replacing the N number of originally-calculated angle coordinates with the N number of after-compensation angle coordinates, the angle coordinates positioning error resulted from the eccentric error can be solved.

Accordingly, in order to achieve the primary objective of the present invention, the inventor of the present invention firstly provides a precision calibration method for being applied in a high-precise rotary encoder system, comprising steps of:

(1) providing the high-precise rotary encoder system comprising a rotary encoding body having an optical position surface, a laser speckle image capturing module having a 2D image sensor, and a controlling and processing module; wherein the rotary encoding body is connected to a center rotary shaft of a work equipment, and a precision calibration angle being included between the horizontal axis of the 2D image sensor and the horizontal axis of the rotary encoding body;

(2) making the rotary encoding body continuously rotate by a constant small angle until the rotary encoding body rotates a full circle, and using the laser speckle image capturing module to treat a laser speckle image capturing process to the optical position surface during the rotation of the rotary encoding body, so as to obtain N frames of laser speckle image from the optical position surface and then store the N frames of laser speckle image in a data base of the controlling and processing module;

(3) using at least one image comparison library established in the controlling and processing module to treat a first frame of laser speckle image and a N-th frame of laser speckle image in the N frames of laser speckle image with a key features matching process, so as to calculate an eccentric displacement;

(4) determining whether the eccentric displacement is greater than a position precision of the laser speckle image capturing module, if yes, proceeding to step (6); otherwise, proceeding to step (5);

(5) using the at least one image comparison library to treat each of two adjacent frames of laser speckle image in the N frames of laser speckle image with the key features matching process for obtaining a plurality of displacement vectors, and then N number of angle coordinates corresponding to the N frames of laser speckle image being respectively calculated based on the plurality of displacement vectors;

(6) calculating an average rotation radius of the rotary encoding body, and then calculating N number of coordinate vectors corresponding to the N frames of laser speckle image;

(7) treating each of two adjacent coordinate vectors in the N number of coordinate vectors with an inner product calculation, so as to obtain N number of after-compensation angle coordinates;

wherein when the step (5) and the step (6) are executed, a α rotation matrix being used for treating the displacement vectors with a displacement vector transforming process.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 7A, FIG. 7B, and FIG. 7C show flow charts of a precision calibration method for being applied in a high-precise rotary encoder system according to the present invention.

DETAILED DESCRIPTION OF THE PREFERRED EMBODIMENTS

To more clearly describe a precision calibration method for high-precise rotary encoder according to the present invention, embodiments of the present invention will be described in detail with reference to the attached drawings hereinafter.

Figure 4:
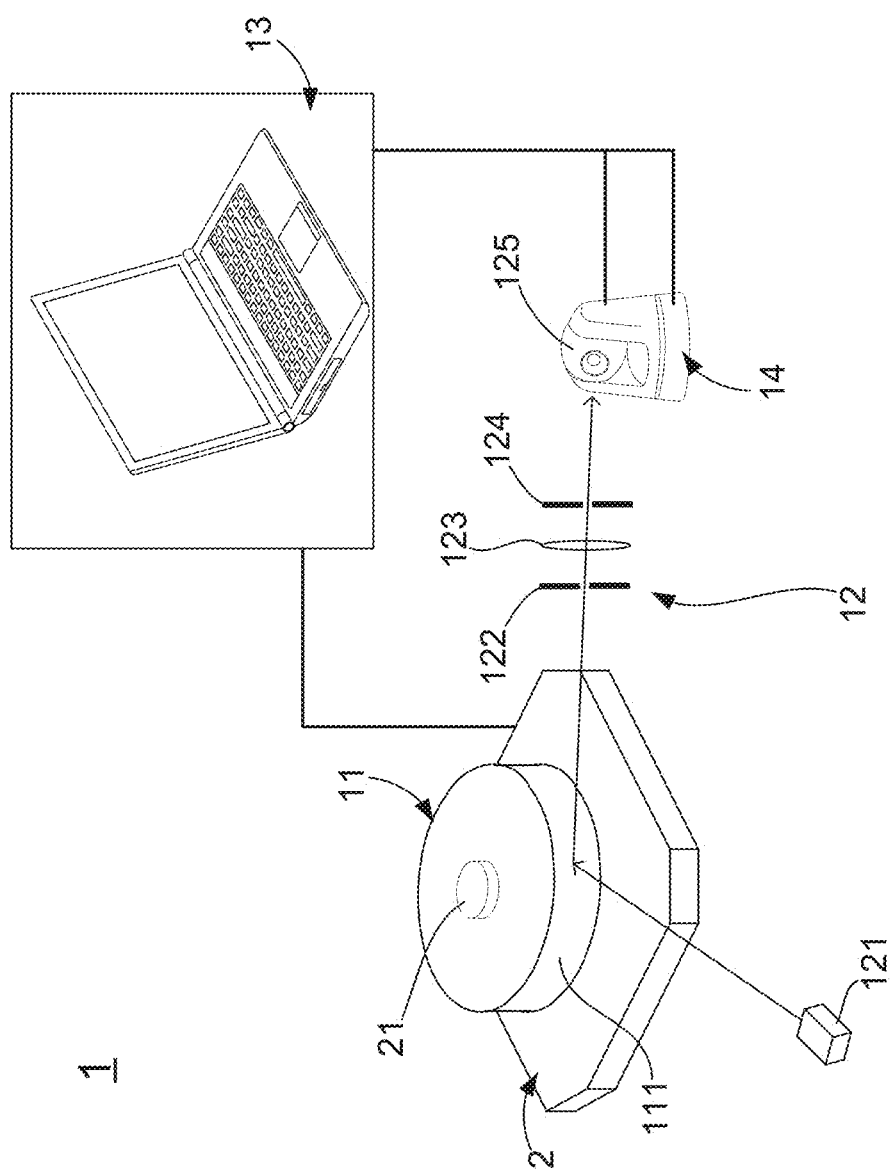
FIG. 4 shows a schematic framework view of a high-precise rotary encoder system.

Please refer to FIG. 4, which illustrates a schematic framework view of a high-precise rotary encoder system. As shown in FIG. 4, the high-precise rotary encoder system 1 consists of: a rotary encoding body 11, a laser speckle image capturing module 12, a controlling and processing module 13, and an angle adjusting module 14, wherein the rotary encoding body 11 has an optical position surface 111, and the controlling and processing module 13 has at least one image comparison library, at least one mathematical library and a data base.

Figure 5A:
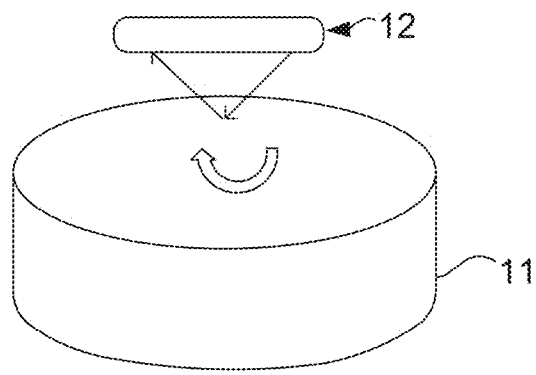
FIG. 5A shows a stereo view of a rotary encoding body.
Figure 5B:
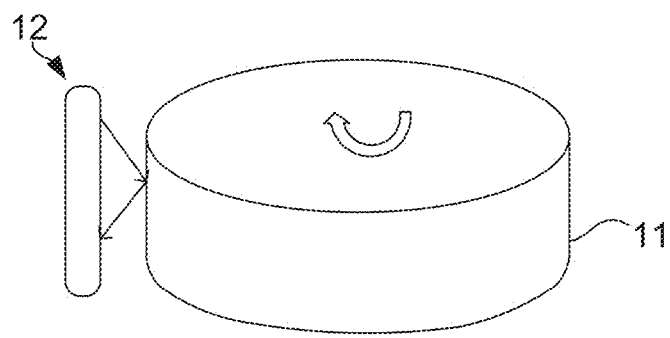
FIG. 5B shows stereo view of the rotary encoding body.
Figure 5C:
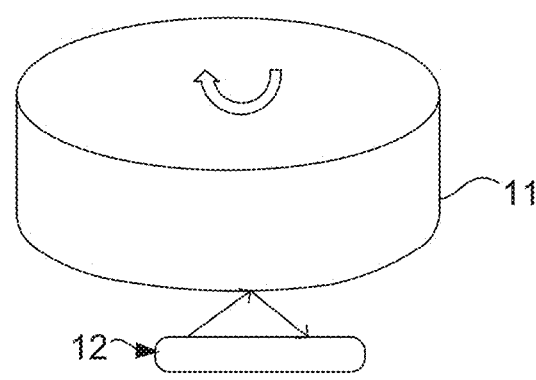
FIG. 5C shows stereo view of the rotary encoding body.

With reference to FIG. 5A, FIG. 5B, and FIG. 5C, where provide different stereo views of the rotary encoding body 11. In the high-precise rotary encoder system 1, the laser speckle image capturing module 12 coupled to the controlling and processing module 13 is used for emitting a coherence light (e.g., a laser light) to the optical position surface 111 of the rotary encoding body 11, such as emitting the laser light to the top surface of the rotary encoding body 11 (as shown in FIG. 5A), emitting the laser light to the side surface of the rotary encoding body 11 (as shown in FIG. 5B), or emitting the laser light to the bottom surface of the rotary encoding body 11 (as shown in FIG. 5C). After that, a reflective light of the laser light would emit from the optical position surface 111 to the 2D image sensor 125 of the laser speckle image capturing module 12, such that the 2D image sensor 125 would receive the reflective light and sense the laser speckle image from the reflective light.

The primary technology feature of the precision calibration method is that: using a laser speckle image capturing module 12 to capture N frames of laser speckle image from an optical position surface 111 of a rotary encoding body 11, and then using image comparison libraries and particularly-designed mathematical equations embedded in the controlling and processing module 13 to calculate N number of displacement vectors ($\overrightarrow{\Delta R_i}$) based on the N frames of laser speckle image, so as to eventually calculate N number of angle coordinates ($\Delta\theta_i$) corresponding to the N frames of laser speckle image based on the plurality of displacement vectors. Moreover, a α rotation matrix is firstly proposed and used in this precision calibration method, and used for treating the displacement vectors with a displacement vector transforming process in order to effectively enhance the position precision of the high-precise rotary encoder system 1.

Figure 6:
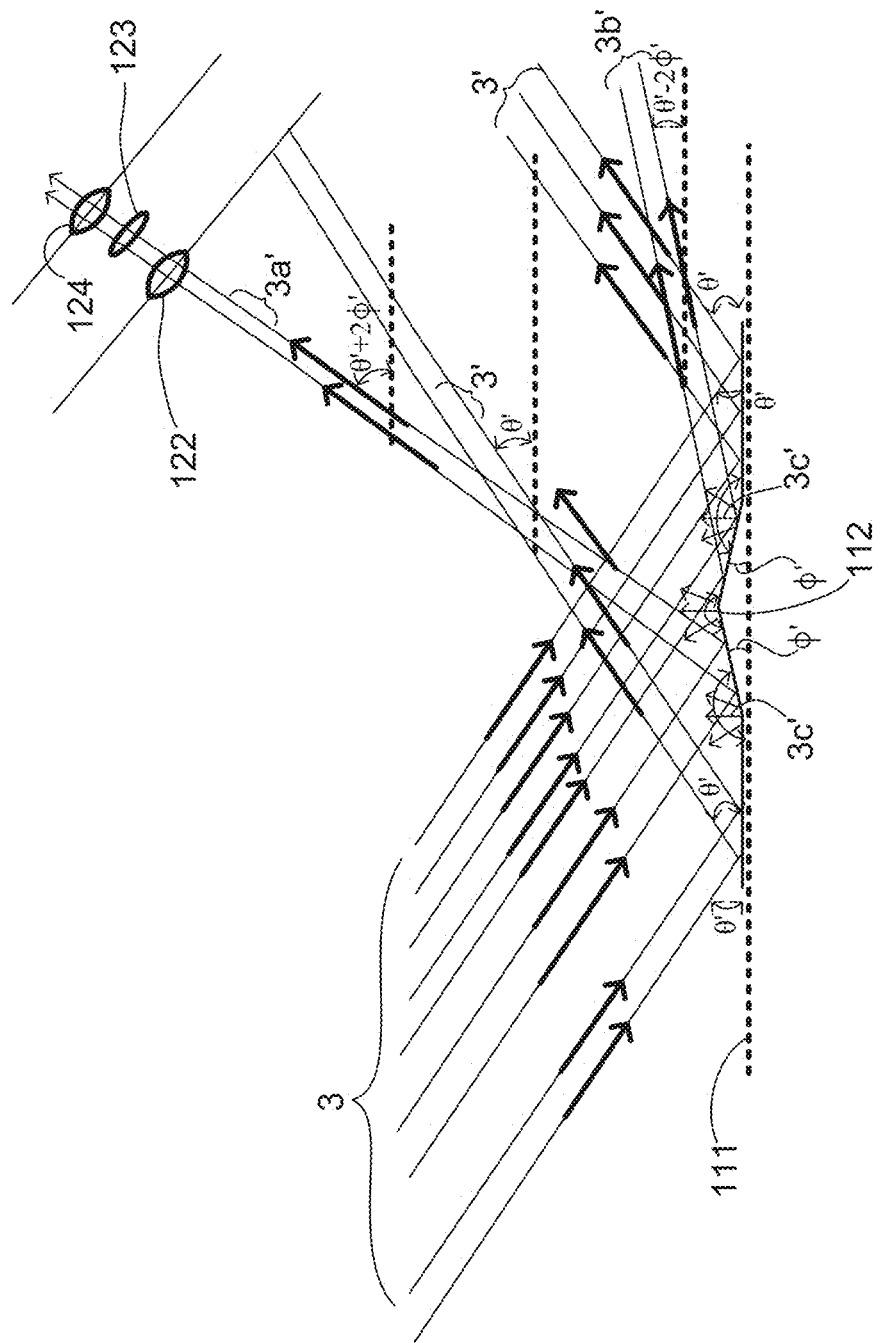
FIG. 6 shows a dynamic light-path diagram of a laser light when the laser light incidents onto an optical position surface of the rotary encoding body.

Continuously referring to FIG. 4, and please simultaneously refer to FIG. 6, which illustrates a dynamic light-path diagram of the laser light when the laser light incidents on to the optical position surface 111. As shown in FIG. 4 and FIG. 6, the laser speckle image capturing module 12 consists of: a light emitting device 121, a front-stage aperture 122, a lens 123, a rear-stage aperture 124, and a 2D image sensor 125, wherein the light-emitting device 121 is used for emitting the laser light 3 to the optical position surface 111 of the rotary encoding body 11. In addition, the front-stage aperture 122 is used for filtering scattering lights of the reflective light 3' of the laser light 3, and the rear-stage aperture 124 is used for controlling the size of laser speckles of the reflective light 3' received by the 2D image sensor 125. Moreover, the 2D image sensor 125 can be a CCD image sensor or a CMOS image sensor, which is used for sensing and recording the laser speckle image formed through the lens 123. It is worth further explaining that, when the laser light 3 incidents onto the optical position surface 111 of the rotary encoding body 11, for example, the side surface of the rotary encoding body 11, the laser speckle image sensed by 2D image sensor 125 from the reflective light 3' would be a laser speckle image having unique texture feature. The reason is that each of object surfaces of one single object has a unique 3D surface texture.

In order to ensure all the laser speckle images captured by the laser speckle image capturing module 12 would include their unique texture features, the laser speckle image capturing module 12 does not capture the laser speckle images from the optical position surface 111 based on traditional specular reflection framework. The primary reason is that, a zero-order beam (i.e., the reflective light 3' shown in FIG. 6) produced based on the principle of incident angle being equal to reflective angle is very easy to overlap with others high-order beam (i.e., the diffractive light 3c') which were diffracted from corners of the small object surfaces. That means the zero-order laser speckle image would be very easy to overlap with the high-order laser speckle images, so as to cause the laser speckle image sensed by the 2D image sensor 125 be not an image-invariant laser speckle image having unique texture feature.

As FIG. 4 and FIG. 6 show, the optical position surface 111 can be regarded as a plane object surface macroscopically; however, considering to the plane object surface microcosmically, the plane object surface is constructed by connecting many small object surfaces 112 to each other, wherein these small object surfaces 112 have different small angles, and the said small angle is defined as an included angle between the normal line of the small object surface 112 and the normal line of the plane object surface. From FIG. 6, it can find that the small object surfaces 112 having 0° included angle show the largest construction density in the optical position surface 111, so that these 0° small object surfaces 112 would provide maximum-energy laser speckle images to the 2D image sensor 125. However, these 0° small object surfaces 112 would also provide maximum-energy noise source to the 2D image sensor 125. The reason is that the 0° small object surfaces 112 are very easy to mixed with high-order diffracted light 3c', and the mixing speckle patterns are very easy change after a small displacement.

According to light reflection principle, if the included angle between the normal line of the small object surface 112 and the normal line of the plane object surface is Ø', then, it can find that the reflective angle of the reflective light 3' is changed by 2Ø' degree when the incident angle of the laser light 3 irradiating onto the small object surface 112 is changed by Ø' degree, such that the original reflective light 3' becomes the reflective light 3a' shown as FIG. 6. Therefore, as long as letting the angle difference between the optical axis of the 2D image sensor 125 and the original reflective light 3' to be 2Ø' degree, the small object surfaces 112 would become an image-capturing surface for the 2D image sensor 125, such that the laser speckle images captured by the 2D image sensor 125 from the small object surfaces 112 must be image-invariant laser speckle images having unique texture feature. By such way, the 2D image sensor 125 is guaranteed to capture image-invariant laser speckle images having unique texture feature from the optical position surface 111 of the rotary encoding body 11 under a best signal-to-noise ratio. For instance, if the included angle between the normal line of the small object surfaces 112 and the normal line of the plane object surface (i.e., the optical position surface 111) is 5°, then these 5° small object surfaces 112 having unique texture feature becomes specular reflection image-capturing surface for the 2D image sensor 125 as long as letting angle difference between the optical axis of the 2D image sensor 125 and the original reflective light 3' to be 10°. Therefore, the laser speckle images captured by the 2D image sensor 125 from the 5° small object surfaces 112 must be image-invariant laser speckle images having unique texture feature. The reason is that, since the optical field phases of the imaging points in the specular reflection are identical, the 3D texture features of the 5° small object surfaces 112 would become luminous light spots sensed by the 2D image sensor 125. So that, the luminous light spots included by the captured laser speckle images are therefore taken as key feature points in the present invention. Herein, it needs to further explain that, the included angle between the optical axis of the 2D image sensor 125 and the said plane object surface (i.e., the optical position surface 111) becomes to θ'+10° after letting the angle difference between the optical axis of the 2D image sensor 125 and the original reflective light 3' to be 10°.

On the contrary, as FIG. 6 shows, if the included angle between the laser light 3 and the plane object surface (i.e., the optical position surface 111) is θ', then the included angle between the reflective light 3' and the 0° small object surfaces 112 shown in FIG. 6 would also be θ'. It is able to know that, the reflective light 3' reflected from the 0° small object surfaces 112 would not be sensed by the 2D image sensor 125 because of being blocked by the front-stage aperture 122 and the rear-stage aperture 124.

Embodiment

Figure 1:
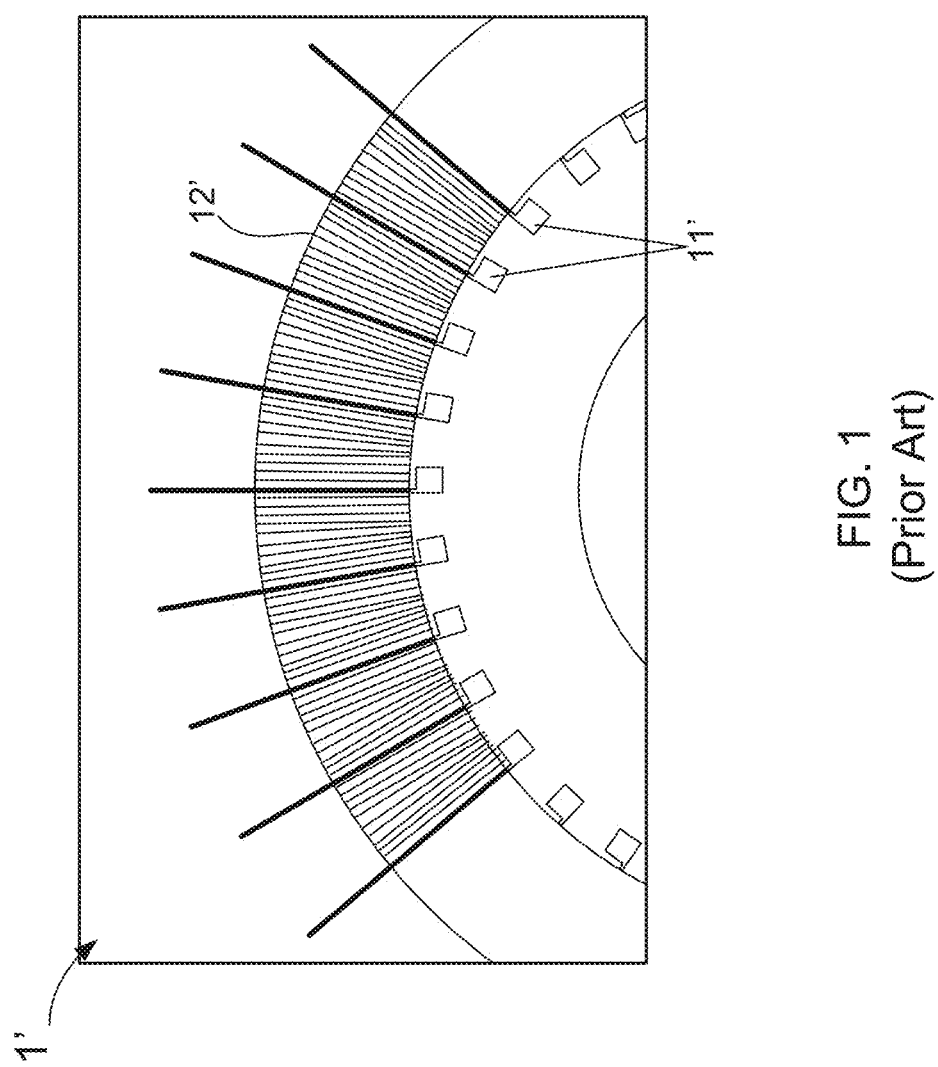
FIG. 1 shows a schematic framework view of an absolute positioning circular grating.
Figure 2:
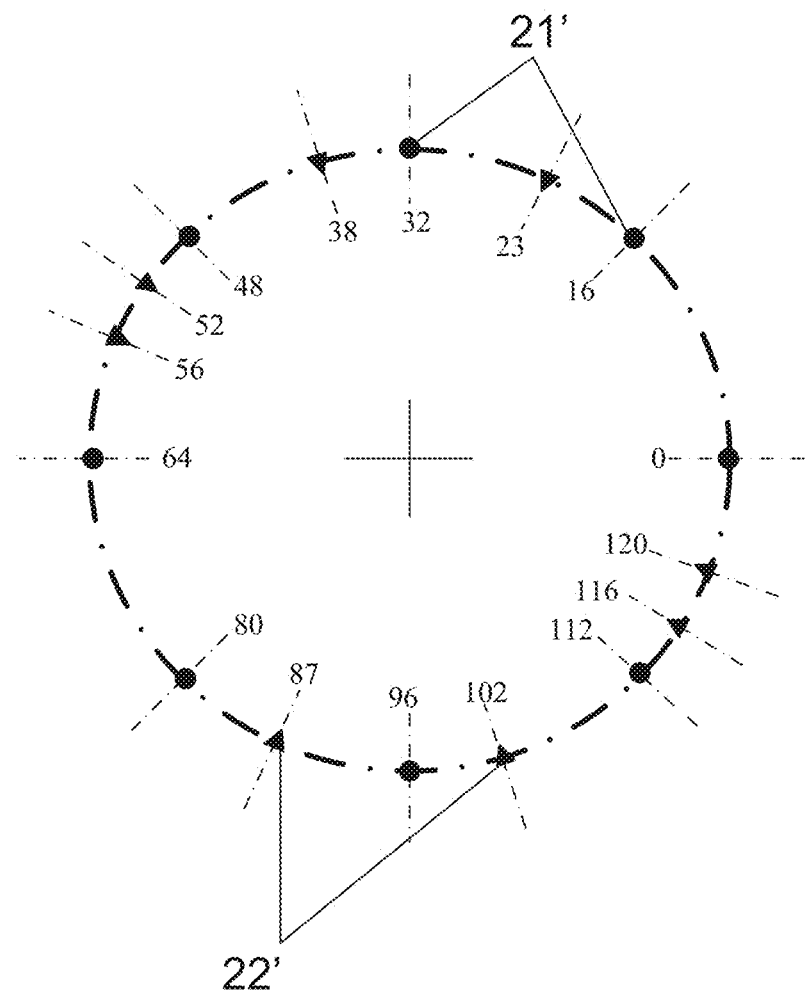
FIG. 2 shows an arrangement diagram of the multiple optical sensors.
Figure 3:
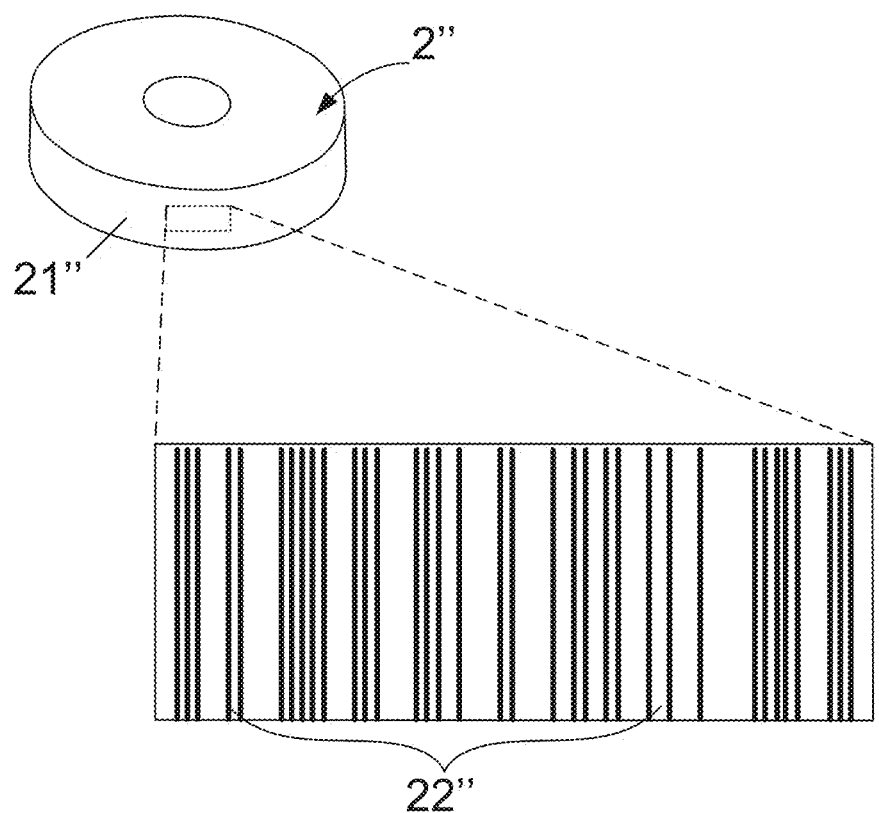
FIG. 3 shows a schematic framework view of the circular angle encoder proposed by ReniShaw.
Figure 7B:
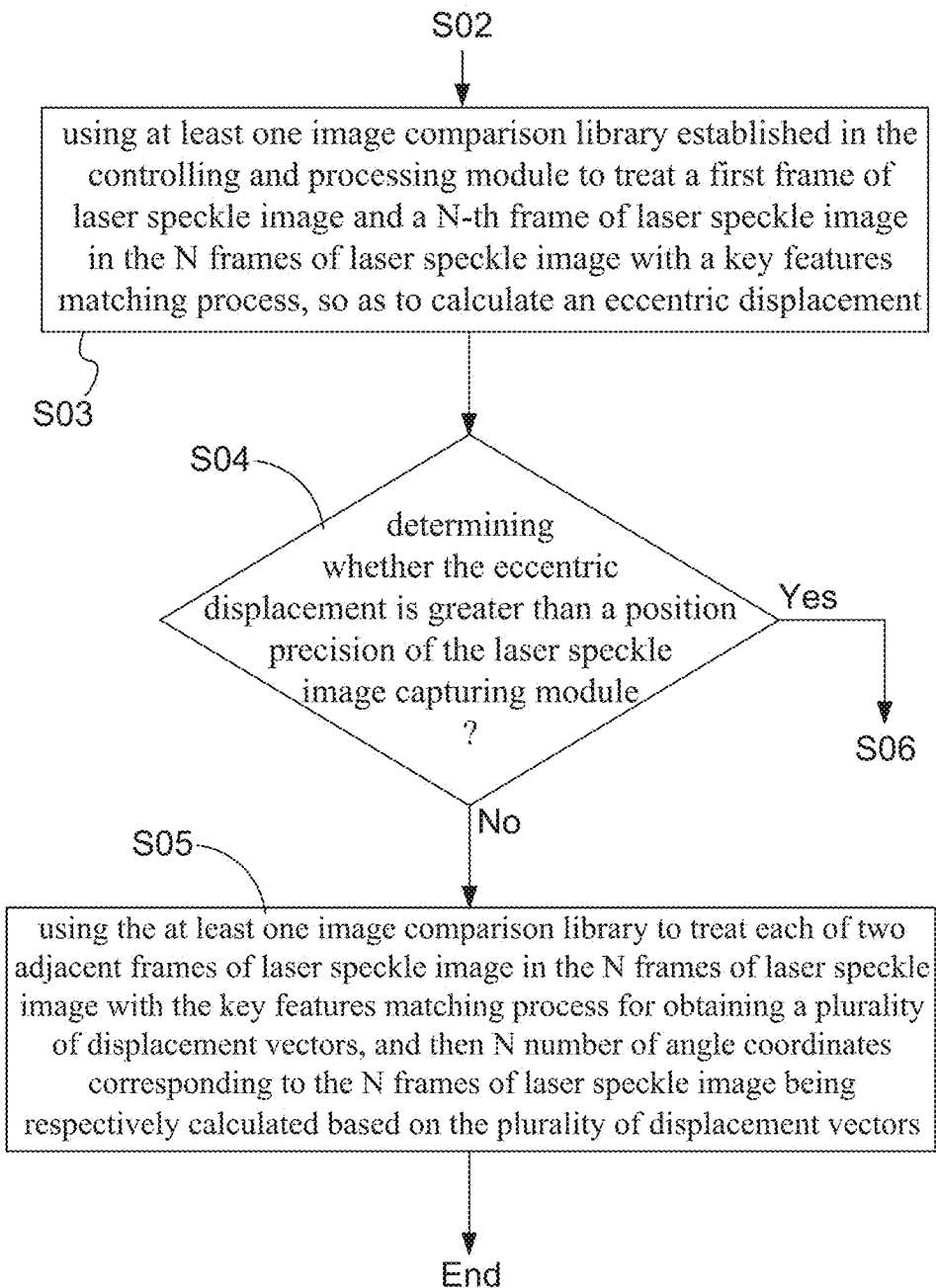
Figure 7C:
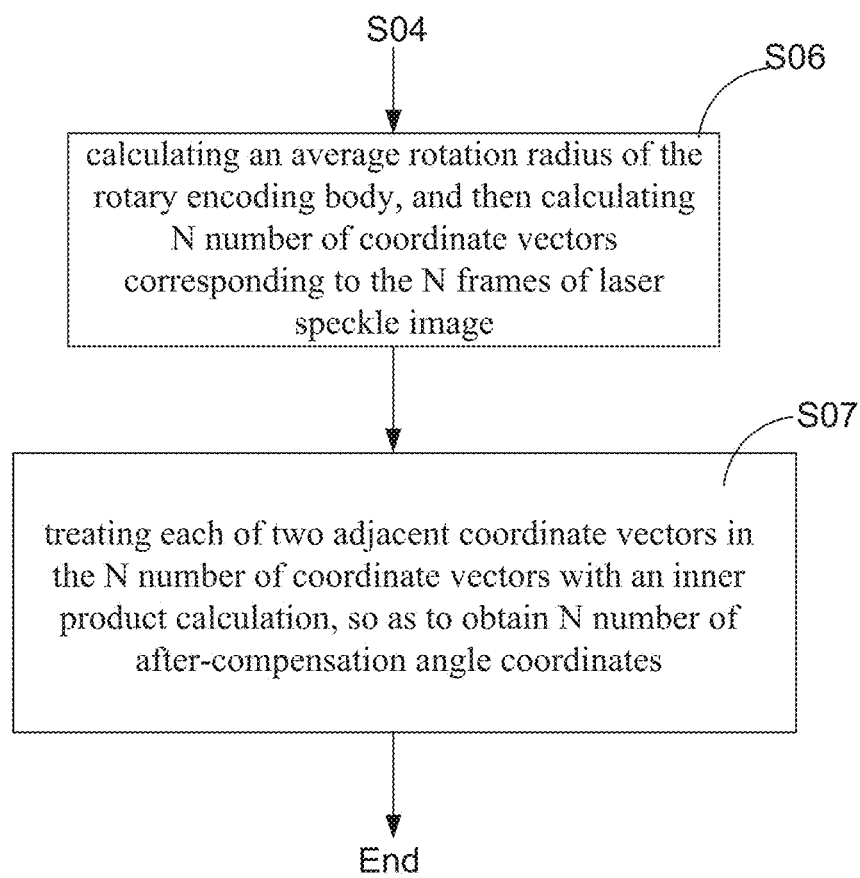

Please refer to FIG. 7A, FIG. 7B, and FIG. 7C, where provides flow chart of a precision calibration method for being applied in a high-precise rotary encoder system according to the present invention. As shown in FIG. 7A, the precision calibration method is first proceeded to step (S01) for providing the high-precise rotary encoder system 1 (as shown in FIG. 4) consisting of: a rotary encoding body 11 having an optical position surface 111, a laser speckle image capturing module 12 having a 2D image sensor 125, and a controlling and processing module 13. As FIG. 4 shows, the rotary encoding body 11 is connected to a center rotary shaft 21 of a work equipment 2; moreover, the horizontal axis of the 2D image sensor 125 and the horizontal axis of the rotary encoding body 11 are set to include a precision calibration angle α. It is worth noting that, the said rotary encoding body 11 can be a cylindrical body or a rotary disk. Besides, the rotary encoding body 11 can also be the absolute positioning circular grating 1' (as shown in FIG. 1) developed by HEIDENHAIN and the circular angle encoder 2" (as shown in FIG. 3) proposed by ReniShaw. The primary reason is that, the angle coordinating technology of the present invention is to access the natural 3D texture feature of the optical position surface 111 of the rotary encoding body 11, but not to sense the annular gratings or read the barcodes pre-processed on the rotary encoding body 11.

Continuously, the method proceeds to step (S02) for making the rotary encoding body 11 continuously rotate by a constant small angle (AO) until the rotary encoding body 11 rotates a full circle, and using the laser speckle image capturing module 12 to treat a laser speckle image capturing process to the optical position surface 111 during the rotation of the rotary encoding body 11, so as to obtain N frames of laser speckle image from the optical position surface 111 and then store the N frames of laser speckle image in a data base of the controlling and processing module 13. Subsequently, the method proceeds to step (S03) for using at least one image comparison library installed in the controlling and processing module 13 to treat a first frame of laser speckle image and a N-th frame of laser speckle image in the N frames of laser speckle image with a key features matching process, so as to calculate an eccentric displacement.

Figure 8:
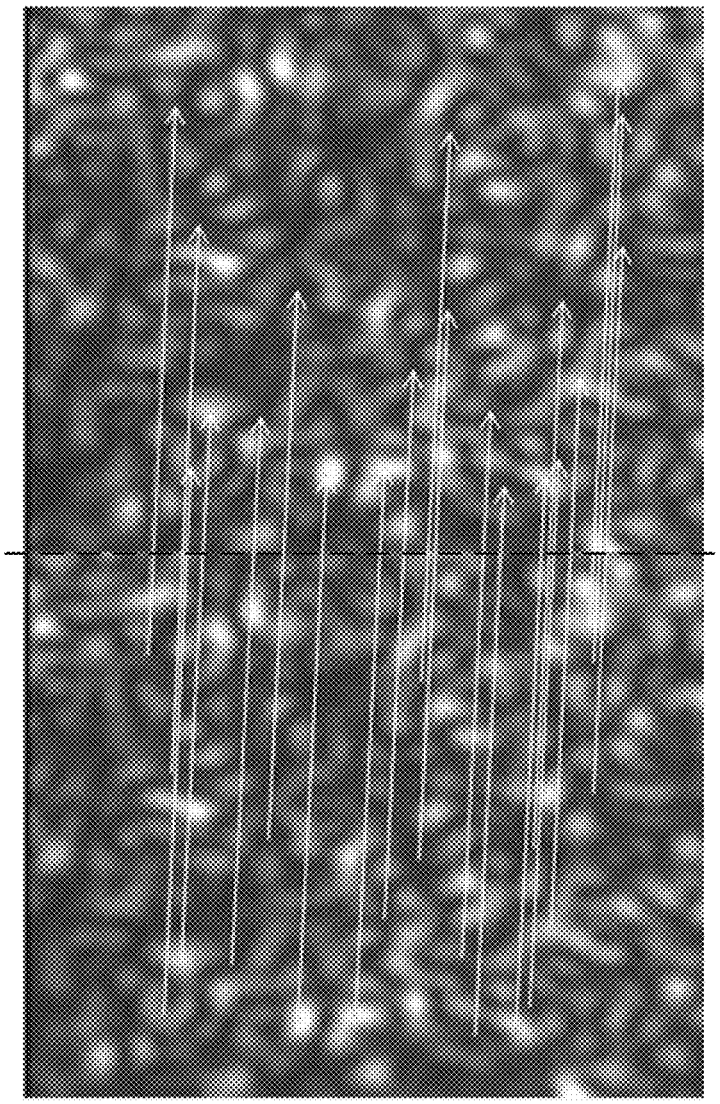
FIG. 8 shows a real image diagram including two adjacent frames of laser speckle image in the N frames of laser speckle image.

Please refer to FIG. 8, which shows a real image diagram of two adjacent frames of laser speckle image in the N frames of laser speckle image. Through at least one image comparison library, such as SIFT (Scale Invariant Feature Transform) or SURF (Speed Up Robust Feature), any two adjacent frames of laser speckle image can be completed with a key features matching process in the controlling and processing module 13. If taking SONY®XCL-5005 industrial camera (CCD chip size: 3.45 μm×3.45 μm) produced by SONY company as the 2D image sensor 125, then, it is able to firstly eliminate the feature matching points greater than 1.5 fold of statistical displacement standard deviation when executing the key features matching process on the two adjacent frames of laser speckle image; thus, the comparison precision of the key features between two adjacent frames of laser speckle image can reach up to 0.008 pixel of displacement standard deviation of the object plane (i.e., the optical position surface 111). That means the position precision of the 2D image sensor 125 on the optical position surface 111 can reach up to 34.1 nm (34.1 nm=(3.45 μm×0.008)÷0.1), which is about 0.01 pixel of displacement standard deviation. Herein, it needs to particularly note that, when using the laser speckle image capturing module 12 to treat the laser speckle image capturing process to the rotary encoding body 11 continuously rotating by a constant small angle, the image capture range of the 2D image sensor 125 must be smaller than or equal to a movable distance for guaranteeing the laser speckle image to be invariant; moreover, the image capture range of the 2D image sensor 125 must be greater than 2 fold of the circumference displacement of the rotary encoding body 11 when the rotary encoding body 11 is rotated one time by the constant small angle ($\Delta\theta$). That means: the displacement of object plane≤½ (image capture range)≤the movable distance for guaranteeing the laser speckle image to be invariant. Therefore, two adjacent frames of laser speckle image would have an overlapped image capture range greater than 0.5 fold of the image capture range base on such image-capturing limitations; so that, the two laser speckle images in the overlapped image capture range would reveal the same feature matching points.

Figure 9:
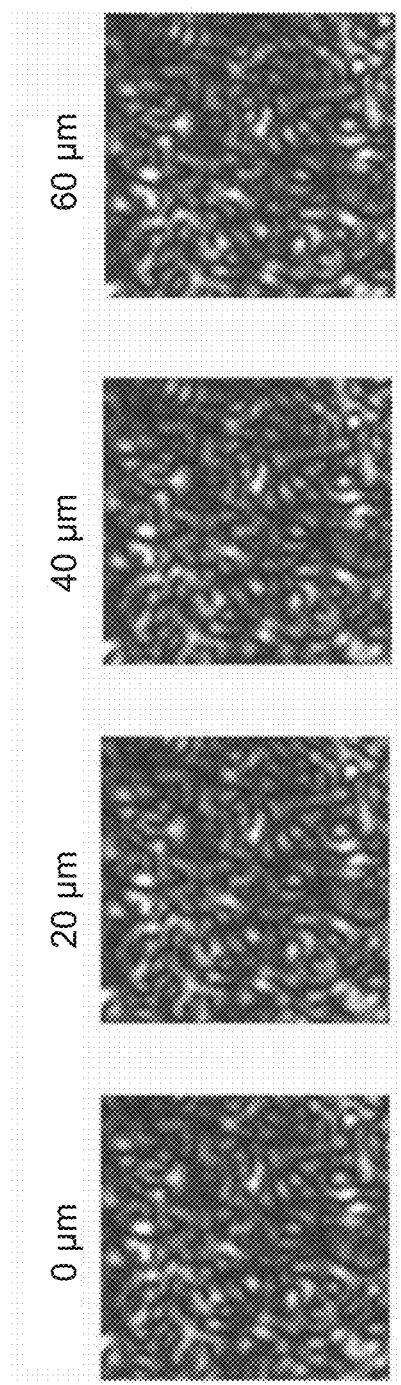
FIG. 9 shows a real image diagram including 4 laser speckle image frames adjacent to each other.

Please refer to FIG. 9, where provides a real image diagram including 4 laser speckle image frames adjacent to each other. In which, a first frame of laser speckle image and the first frame of laser speckle image has been treated with the key features matching process (abbreviated to "0-0 comparison"), the first frame of laser speckle image and a second frame of laser speckle image has been treated with the key features matching process (abbreviated to "0-20 comparison"), the first frame of laser speckle image and a third frame of laser speckle image has been treated with the key features matching process (abbreviated to "0-40 comparison"), and the first frame of laser speckle image and a fourth frame of laser speckle image has been treated with the key features matching process (abbreviated to "0-60 comparison"). Moreover, the results of 4-times key features matching processes are integrated in following Table (1).

TABLE 1

| Image Frame (μm) | X-axis displacement (pixel) | Key Feature Matches Point |
| --- | --- | --- |
| 0-0 | 0 | 466 |
| 0-20 | 4.27 | 293 |
| 0-40 | 8.54 | 175 |
| 0-60 | 12.8 | 96 |

From the Table (1), it can find that, because two adjacent frames of laser speckle image have larger or largest overlap region, there are show larger amount of identical key feature points between the two adjacent laser speckle image frames. However, with the increase of the displacement of the laser speckle image, for example, the displacement between the first laser speckle image frame and the fourth laser speckle image frame is 12.8 pixel, the identical key feature points between the two adjacent laser speckle image frames obviously reduce. That means the overlap region between the first laser speckle image frame and the fourth laser speckle image frame are reduced. So that, by using the image comparison library to treat two adjacent frames of laser speckle image with the key features matching process, it can not only calculate the image displacement between the two laser speckle image frames, but also can precisely calculate the position coordinates of the two image capture points on the optical position surface 111 for capturing the two laser speckle image frames.

Furthermore, the first laser speckle image frame and the first laser speckle image frame has been treated with the key features matching process (abbreviated to "0-0 comparison"), the first laser speckle image frame and the second laser speckle image frame has been treated with the key features matching process (abbreviated to "0-20 comparison"), the second frame of laser speckle image and the third frame of laser speckle image has been treated with the key features matching process (abbreviated to "20-40 comparison"), and the third frame of laser speckle image and the fourth frame of laser speckle image has been treated with the key features matching process (abbreviated to "40-60 comparison"). Moreover, the results of 4-times key features matching processes are integrated in following Table (2).

TABLE 2

| Image Frame (μm) | X-axis displacement (pixel) | Key Feature Point Matches | Accumulated displacement (pixel) |
| --- | --- | --- | --- |
| 0-0 | 0 | 466 | 0 |
| 0-20 | 4.27 | 293 | 4.27 |

TABLE 2-continued

| Image Frame (μm) | X-axis displacement (pixel) | Key Feature Point Matches | Accumulated displacement (pixel) |
|---|---|---|---|
| 20-40 | 4.26 | 295 | 8.53 |
| 40-60 | 4.28 | 276 | 12.81 |

From the Table (2), it can find the image displacement between all of the two adjacent laser speckle image frames are almost identical, and the amount of identical key feature points between all of the two adjacent laser speckle image frames are almost the same (293, 295, and 276). Moreover, after comparing the accumulated displacement obtained from 0-0 comparison with the accumulated displacement obtained from 0-20 comparison, 20-40 comparison and 40-60 comparison, respectively, it can find all the displacement differences between the 0-0 comparison and 0-20 comparison, the 0-0 comparison and 0-40 comparison as well as the 0-0 comparison and 40-60 comparison falls in ±1/100 pixel.

Figure 10:
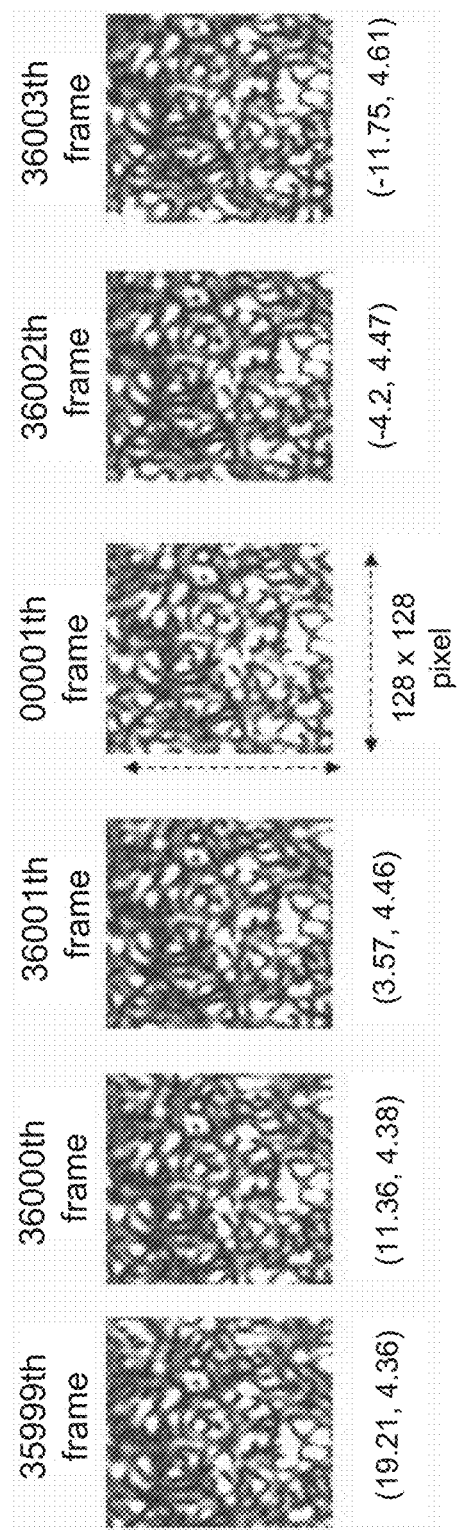
FIG. 10 shows a real image diagram including 6 laser speckle image frames adjacent to each other.

Please continuously refer to FIG. 10, where provides a real image diagram including 6 laser speckle image frames adjacent to each other. When the applied rotary encoding body 11 has an outer radius of 33 cm, there would have 36003 frames of laser speckle image to be captured by the 2D image sensor 125 after the step (S02) has been executed. As shown in FIG. 8, after using the image comparison library to treat a first (00001th) frame of laser speckle image and a 36000th frame of laser speckle image in the 36003 frames of laser speckle image with a key features matching process, it can easily calculate and obtain the X-axis image displacement of 11.36 pixel and the Y-axis image displacement of 4.38 pixel between these two laser speckle image frames. Furthermore, after executing the key features matching process on the first (00001th) frame of laser speckle image and a 360001th frame of laser speckle image as well as the first (00001th) frame of laser speckle image and a 36002th frame of laser speckle image, it can obtain that the Y-axis image displacements between the first laser speckle image frame and the 360001th laser speckle image frame as well as the first laser speckle image frame and the 360002th laser speckle image frame are 4.46 pixel and 4.47 pixel, respectively. Thus, based on above comparison result, it is able to know an eccentric error has occurred between the center rotary shaft 21 of the work equipment 2 and the rotary encoding body 11.

As FIG. 1 and FIG. 3 show, both the absolute positioning circular grating 1' developed by HEIDENHAIN and the circular angle encoder 2" proposed by ReniShaw would reveal the said eccentric error after long term use. However, differing from the two commercial encoders cannot automatically verify or detect the eccentric error, the novel method proposed by the present invention particularly includes the step (S03) for using the image comparison library comprised by the controlling and processing module 13 to treat a first frame of laser speckle image and a N-th frame of laser speckle image in the N frames of laser speckle image with a key features matching process, so as to calculate an eccentric displacement. Therefore, the high-precise rotary encoder system 1 (as shown in FIG. 4) can automatically detect the eccentric error by determining whether the eccentric displacement is greater than the position precision of the laser speckle image capturing module 12 or not.

Figure 11:
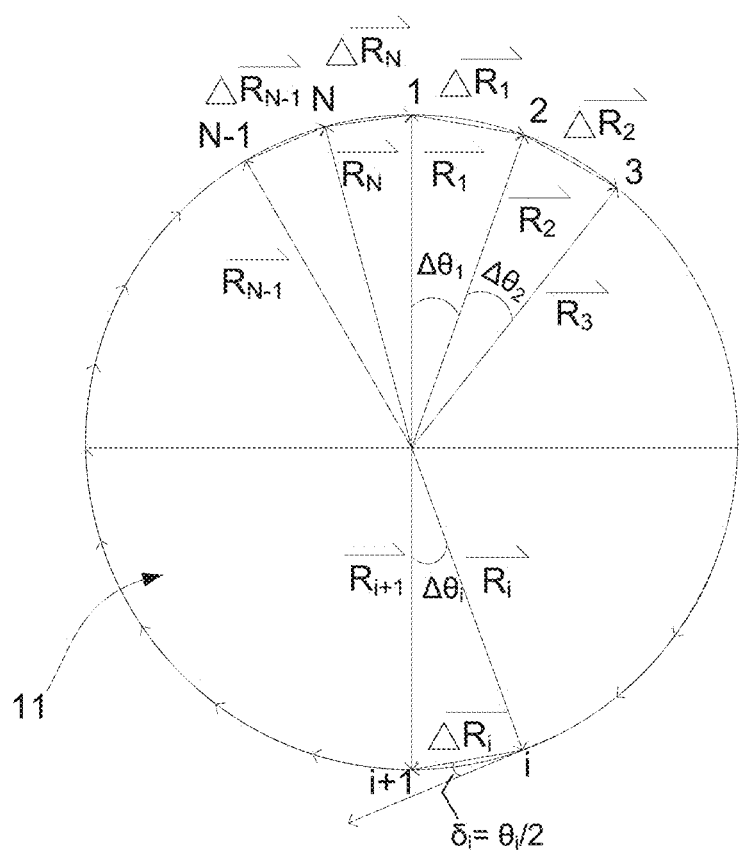
FIG. 11 shows a top view of the rotary encoding body.

Please refer to FIG. 11, which illustrates a top view of the rotary encoding body 11. After using the laser speckle image capturing module 12 to treat a laser speckle image capturing process to the optical position surface 111 during the rotary encoding body 11 continuously rotate by a constant small angle (Δθ) until rotating a full circle, there would have N frames of laser speckle image to be captured from the optical position surface 111.

Herein, it needs to further explain that, "1", "2", "N-1", and "N" marked on the circumferential surface (i.e., the optical position surface 111) of the rotary encoding body 11 represent the image capturing points for the 2D image sensor 125. Moreover, $\Delta\vec{R_1}$ represents the displacement vector between the image capturing points 1 and 2, $\Delta\vec{R_2}$ represents the displacement vector between the image capturing points 2 and 3, $\Delta\vec{R_{N-1}}$ represents the displacement vector between the image capturing points N-1 and N, and $\Delta\vec{R_N}$ represents the displacement vector between the image capturing points N and 1, wherein $\Delta\vec{R_N} = \vec{R_1} - \vec{R_N} = (dx'_N, dy'_N)$, and $dy'_N$ is defined as the eccentric displacement. Thus, when the eccentric displacement is small than the position precision, i.e., $|dy'_N| \leq \epsilon$ ($\epsilon \ll 1$), that means the concentricity between the rotary encoding body 11 and the center rotary shaft 21 of the work equipment 2 is under standard spec. On the contrary, when the eccentric displacement is greater than the position precision, i.e., $|dy'_N| > \epsilon$, that means the concentricity between the rotary encoding body 11 and the center rotary shaft 21 of the work equipment 2 is out of standard spec. Meanwhile, a compensation for the eccentric error between the rotary encoding body 11 and the center rotary shaft 21 must be executed on the high-precise rotary encoder system 1.

So that, when the determining result of the step (S04) is "No", the method is subsequently proceeds to step (S05) for using the image comparison library to treat each of two adjacent frames of laser speckle image in the N frames of laser speckle image with the key features matching process, so as to obtain a plurality of displacement vectors $\Delta\vec{R_i}$ and then N number of angle coordinates corresponding to the N laser speckle image frames are respectively calculated based on the plurality of displacement vectors $\Delta\vec{R_i}$.

As FIG. 11 shows, after rotating the rotary encoding body 11 by a constant small angle $\Delta\theta_i$, the position-fixed 2D image sensor 125 would captured a i-th frame of laser speckle image and a (i+1)-th frame of laser speckle image from the optical position surface 111. Thus, through the image comparison library, the displacement vector of these two laser speckle image frames can be obtained by the controlling and processing module 13, wherein the displacement vector is $\Delta\vec{R_i} = (dx'_i, dy'_i)$. Furthermore, the chord length between the image capturing points i and i+1 can be calculated by using the mathematical equation of $$|\vec{R_1}| = \sqrt[2]{dx_i'^2 + dy_i'^2}.$$

On the other hand, since the N-th frame of laser speckle image and the first frame of laser speckle image have a largest overlap region, it is able to derive the mathematical equation of $\Sigma_1^N \Delta\vec{R_i} = 0$ based on vector superposition principle. Thus, it can further obtain the positioning circumference length of the rotary encoding body 11 by using the mathematical equation of $\Sigma_1^N \Delta R |\Delta \vec{R_i}| = \Sigma \Delta R$. After obtaining the positioning circumference length $\Sigma \Delta R$ of the rotary encoding body 11, the controlling and processing module 13 is able to subsequently calculate all of the N number of angle coordinates corresponding to the N laser speckle image frames.

Firstly, a first angle coordinate corresponding to the first frame of laser speckle image is defined as 0°. Next, a second angle coordinate corresponding to the second frame of laser speckle image is calculated by the mathematical equation of $$\theta_1 = \Delta\theta_1 = 360° \times \frac{|\Delta \vec{R_1}|}{\Sigma \Delta R},$$

and a third angle coordinate corresponding to the third frame of laser speckle image is calculated by the mathematical equation of $$\theta_2 = \Delta\theta_1 + \Delta\theta_2 = 360° \times \frac{(|\Delta \vec{R_1}| + |\Delta \vec{R_2}|)}{\Sigma \Delta R};$$

and the like, all of others angle coordinates can be calculated by the mathematical equation of $$\theta_{N-1} = \Delta\theta_1 + \Delta\theta_2 + \ldots + \Delta\theta_{N-2} + \Delta\theta_{N-1} = 360° \times \frac{(\Delta R_1 + \ldots + \Delta R_{N-1})}{\Sigma \Delta R}.$$

In the mathematical equation, $\Delta\theta_{N-1}$ represents a N-th angle coordinate corresponding to the N-th frame of laser speckle image, and $\Delta\theta_N$ represents the first angle coordinate corresponding to the first frame of laser speckle image, so, $$\theta_N = \Delta\theta_1 + \Delta\theta_2 + \ldots + \Delta\theta_{N-2} + \Delta\theta_{N-1} + \Delta\theta_N =$$
$$360° \times \frac{(\Delta R_1 + \ldots + \Delta R_N)}{\Sigma \Delta R} = 360°$$

It is worth noting that, when taking SONY XCL-5005 industrial camera (CCD chip size: 3.45 µm×3.45 µm) produced by SONY® as the 2D image sensor 125, it is able to know the position precision of the 2D image sensor 125 falls in ±1/100 pixel. That means the 2D image sensor 125 cannot detect the difference on the feature matching points between two adjacent laser speckle image frames once the vector displacement is smaller than $$\pm \frac{1}{200} \text{pixel} \left( = \frac{3.45 \, \mu m}{200} = 17.25 \text{ nm} \right).$$

When the rotary encoding body 11 applied in the high-precise rotary encoder system 1 shown in FIG. 4 includes an outer radius of 20 cm, it is able to know the circumference length of the rotary encoding body 11 is 207 cm. Thus, after using the laser speckle image capturing module 12 to treat a laser speckle image capturing process to the optical position surface 111 along the circumference length by a constant object displacement of 20 µm, it eventually obtain the laser speckle image frames of $$\frac{20\pi \text{ cm}}{20 \, \mu m} = \pi \times 10^4.$$

So that, the said constant small angle does therefore be calculated by using the mathematical equation of $$\frac{360°}{\pi \times 10^4} = 0.011°.$$

Moreover, as FIG. 11 shows, because the included angle $\delta_i$ of displacement vector $\Delta \vec{R_i}$, and the tangential direction of the vertical axis of the rotary encoding body 11 is 0.0055° (=0.011°/2), a small circumferential displacement produced as the rotary encoding body 11 is rotated by the constant small angle can be calculated as follows: $\Delta \overrightarrow{\phantom{xxx}} = (dx_{encoder,i}, dy_{encoder,i}) = (20 \, \mu m \times \cos(0.0055°), 20 \, \mu m \times \sin(0.0055°)) = (20 \, \mu m, 1.92 \times 10^{-3} \, \mu m)$. Therefore, since the vertical displacement component of the small circumferential displacement of the rotary encoding body 11 is smaller than 17.25 nm, such small vertical displacement component ($1.92 \times 10^{-3}$ µm) cannot be correctly detected by the 2D image sensor 125. In generally condition, the 2D image sensor 125 would regard such small vertical displacement component as 0 um.

Inheriting to above descriptions, when the small circumferential displacement of the rotary encoding body 11 cannot be detected by the 2D image sensor 125, there has a dark light spots error produced during the controlling and the processing module 13 executes the key features matching process on all of the two adjacent frames of laser speckle image, and such phenomenon is called dark light spots effect.

Thus, in order to solving influence of dark light spots effect, an angle adjusting module 14 (as shown in FIG. 4) is connected to the 2D image sensor 125, so as to adjust the disposing angle of the 2D image sensor 12 for making a precision calibration angle α be included between the horizontal axis of the 2D image sensor 125 and the horizontal axis of the rotary encoding body 11. When 2D image sensor 125 is rotated with angle α, N number of displacement vectors has been obtained after completing the execution of key features matching processes on all of the laser speckle image frames, including: $\Delta \overrightarrow{R_{Dec,1}}, \Delta \overrightarrow{R_{Dec,2}}, \ldots, \Delta \overrightarrow{R_{Dec,N}}$. Thus, it is able to easily find the value of $\Delta \overrightarrow{R_{Dec,i}} = (dx_{Dec,i}, dy_{Dec,i})$, which represents the displacement vectors of the laser speckle image frames. Furthermore, it can also find the included angle of $$\Delta\theta_{Dec,i} = \tan^{-1} \left( \frac{dy_{Dec,i}}{dx_{Dec,i}} \right)$$

between the $\Delta \overrightarrow{R_{Dec,i}}$ and the horizontal axis of the 2D image sensor 125.

Figure 12:
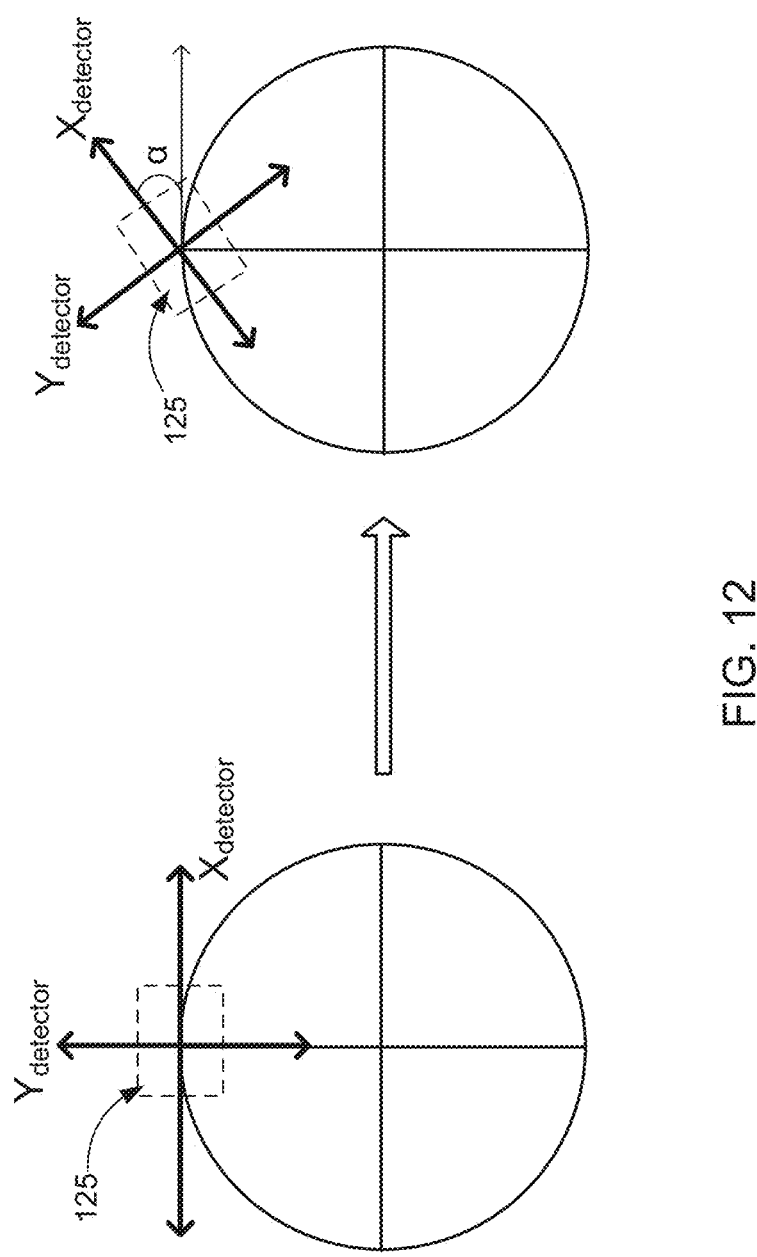
FIG. 12 shows the top view of the rotary encoding body.

Please continuously refer to FIG. 12, where provides the top view of the rotary encoding body 11. Because the horizontal axis of the 2D image sensor 125 (detector) and the horizontal axis of the rotary encoding body 11 (encoder) have a position calibration angle α, the object displacement vectors of the optical position surface 111 of the encoding body 11 can be transformed to the image displacement vectors detected by the 2D image sensor 125 through the following a rotation matrix represented by mathematical formula (1):

$$(dx_{encoder,i}, dy_{encoder,i}) = (dx_{Dec,i}, dy_{Dec,i}) \begin{bmatrix} \cos\alpha & -\sin\alpha \\ \sin\alpha & \cos\alpha \end{bmatrix} \quad (1)$$

In the α rotation matrix, $(dx_{encoder,i}, dy_{encoder,i}) = \vec{\Delta}$ represents a small circumferential displacement produced as the rotary encoding body 11 is rotated by the constant small angle, and $(dx_{Dec,i}, dy_{Dec,i}) = \Delta\vec{R}_{Dec,1}$ represents a i-th displacement vector between a i-th frame of laser speckle image and a (i+1)-th frame of laser speckle image detected by the 2D image sensor. Moreover, α represents the precision calibration angle included between the horizontal axis of the 2D image sensor 125 and the horizontal axis of the rotary encoding body 11.

Figure 13:
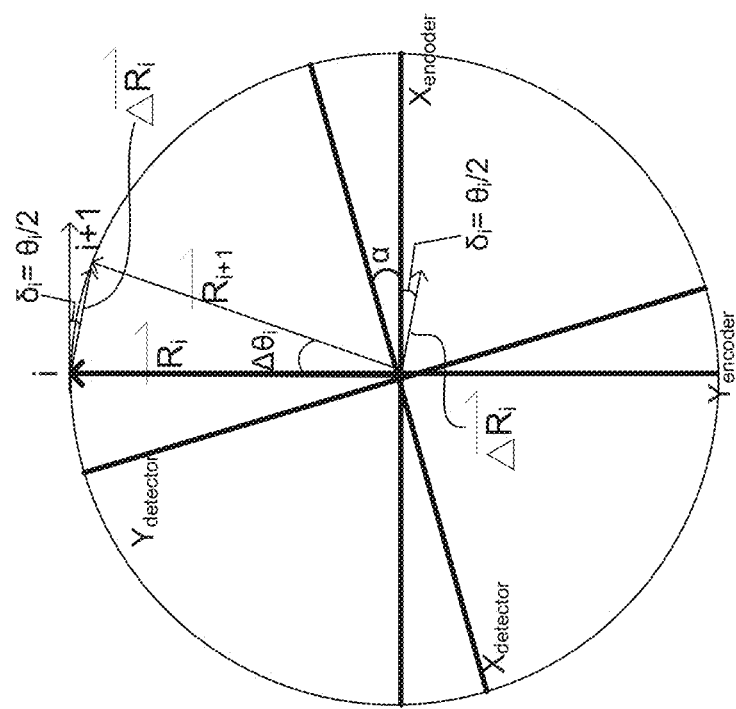
FIG. 13 shows the top view of the rotary encoding body.

Please continuously refer to FIG. 13, where provides the top view of the rotary encoding body 11. It is able to find that the image displacement $\Delta\vec{R}_{Dec,1} = (dx_{Dec,i}, dy_{Dec,i})$ and the included angle of horizontal axis of the 2D image sensor 125 and the $\Delta\vec{R}_{Dec,1}$ can be calculated by using the mathematical equation of $$\Delta\theta_{Dec,i} = \tan^{-1}\left(\frac{dy_{Dec,i}}{dx_{Dec,i}}\right).$$

Besides, FIG. 13 also shows that the small circumferential displacement produced as the rotary encoding body 11 is rotated by the constant small angle can be represented by $\vec{\Delta} = (dx_{encoder,i}, dy_{encoder,i})$, and the included angle between $\vec{\Delta}$ and the horizontal axis of the 2D image sensor 125 is $$\Delta\theta_{encoder,i} = \tan^{-1}\left(\frac{dy_{encoder,i}}{dx_{encoder,i}}\right).$$

Moreover, from FIG. 13, it can further find the relation between $\Delta\theta_{encoder,i}$ and $\Delta\theta_{Dec,i}$ can be represented by the equation of $\Delta\theta_{Dec,i} = \alpha + \Delta\theta_{encoder,i} + \Delta_{noise,i}$, wherein $$\Delta\theta_{encoder,i} = \delta_i = \frac{\Delta\theta_i}{2}.$$

On the other hand, since the summation of the constant small angles must be 360° after the rotary encoding body 11 is rotated a full circle, it is able to derive the following equation (1):

$$\Delta\theta_{encoder,1} + \Delta\theta_{encoder,2} + \ldots + \Delta\theta_{encoder,N-1} + \Delta\theta_{encoder,N} =$$
$$\frac{1}{2}(\Delta\theta_1 + \Delta\theta_2 + \ldots + \Delta\theta_N) = \frac{360°}{2}.$$

Moreover, it can simultaneously find the following equation (2) from the 2D image sensor's view angle: $\Sigma_{i=1}^{i=N} = \Sigma_{i=1}^{i=N} (\Delta\theta_{encoder,i} + \alpha + \Delta\theta_{noise,i})$, wherein the $\Delta\theta_{noise,i}$ means the error angle produced by the image capture noise (or sensing noise) of the 2D image sensor 125. Thus, based on above two equations, the mathematical equation for calculating the value of the precision calibration angle α is therefore derived and represented by mathematical formula (2):

$$\Rightarrow \sum_{i=1}^{i=N} \Delta\theta_{Dec,i} = 180° + N\alpha + 0 \Rightarrow \alpha = \frac{\left(\sum_{i=1}^{i=N} \Delta\theta_{Dec,i}\right) - 180°}{N} \quad (2)$$

From the above mathematical equations and formulae, it can find that the value of $\Sigma_{i=1}^{i=N}\Delta\theta_{noise,i}$ must be 0 because the $\Delta\theta_{noise,i}$ is a random number. Therefore, after obtaining the said precision calibration angle α, the controlling and processing module 13 would inform the angle adjusting module 14 to adjust the disposing angle of the 2D image sensor 12 for making a precision calibration angle α be included between the horizontal axis of the 2D image sensor 125 and the horizontal axis of the rotary encoding body 11. Thus, the small circumferential displacement, i.e., the object displacement vector $(\vec{\Delta} = (dx_{encoder,i}, dy_{encoder,i}))$, produced as the rotary encoding body 11 is rotated by the constant small angle can be precisely calculated by using the α rotation matrix to treating the image displacement vectors $\Delta\vec{R}_{Dec,1} = (dx_{Dec,i}, dy_{Dec,i})$ with a displacement vector transforming process. Herein, it needs to further explain that, the precision calibration angle is calculated by the mathematical equation of $$\alpha = \frac{\left(\sum_{i=1}^{i=N} \Delta\theta_{Dec,i}\right) - 180°}{N},$$

wherein $$\Delta\theta_{Dec,i} = \tan^{-1}\left(\frac{dy_{Dec,i}}{dx_{Dec,i}}\right).$$

As FIG. 7B and FIG. 7C show, when the determining result of the step (S04) is "Yes", it can know the eccentric displacement is greater than the position precision of the 2D image sensor 125, i.e., $|dy'_N| > \epsilon$, and that means the concentricity between the rotary encoding body 11 and the center rotary shaft 21 of the work equipment 2 is out of standard spec. Meanwhile, a compensation for the eccentric error between the rotary encoding body 11 and the center rotary shaft 21 must be executed on the high-precise rotary encoder system 1. Thus, the method is proceeds to step (S06) for calculating an average rotation radius of the rotary encoding body 11 and then calculating N number of coordinate vectors corresponding to the N frames of laser speckle image. After the step (S06), the method is subsequently proceeds to step (S07) for treating each of two adjacent coordinate vectors in the N number of coordinate vectors with an inner product calculation, so as to obtain N number of after-compensation angle coordinates.

Please refer to FIG. 11 again. To obtain the said average rotation radius of the rotary encoding body 11, it needs to firstly make the rotary encoding body 11 continuously rotate by the constant small angle until the rotary encoding body 11 rotates totally m full circles, and use the laser speckle image capturing module 12 to capture (N×m) frames of laser speckle image from the optical position surface 111 during the rotation of the rotary encoding body 11. Next, the image comparison library is used to treat all of the two adjacent laser speckle image frames in the (N×m) laser speckle image frames with the key features matching process, so as to obtain (N×m) number of displacement vectors $\Delta \vec{R_i} = (dx'_i, dy'_i)$. Eventually, the average rotation radius $r_{ave}$ of the rotary encoding body 11 can be calculated by using the mathematical equation of $$r_{ave} = \frac{\sum_{1}^{N \times m} |\Delta \overrightarrow{R_i}|}{m \times 2\pi}.$$

Herein, it needs to further explain that, the α rotation matrix must be used for treating the displacement vectors $\Delta \vec{R_i}$ with a displacement vector transforming process in order to effectively enhance the position precision of the high-precise rotary encoder system 1.

When executing the step (S07), a first coordinate vector corresponding to the first frame of laser speckle image is firstly defined as $\vec{R_1} = (x_1, y_1) = (0, r_{ave})$. Next, the image comparison library is used to treat the first frame of laser speckle image and a second frame of laser speckle image in the N frames of laser speckle image with the key features matching process, so as to obtain a second coordinate vector corresponding to the second frame of laser speckle image, wherein the second coordinate vector is represented by following equation: $\vec{R_2} = (x_2, y_2) = (0, r_{ave}) + (dx'_1, dy'_1)$. In the equation $\Delta \vec{R_1} = (dx'_1, dy'_1)$ represents a first displacement vector between the first frame of laser speckle image and the second frame of laser speckle image.

Furthermore, in the step (S07), the image comparison library are continuously used to treat all of the two adjacent laser speckle image frames in the N frames of laser speckle image with the key features matching process, so as to obtain all of the coordinate vectors represented by $\vec{R_i} = (x_i, y_i) = (x_{i-1}, y_{i-1}) + (dx'_i, dy'_i)$. Eventually, after defining the angle coordinate of the first coordinate vector $\vec{R_1}$ as a first after-compensation angle coordinate (i.e., 0°), all of others after-compensation angle coordinates can be subsequently calculated by using the mathematical equation of $$\Delta \theta_{ic} = \cos^{-1}\left[ \frac{\overrightarrow{R_{i+1}} \cdot \overrightarrow{R_i}}{|\overrightarrow{R_{i+1}}| \times |\overrightarrow{R_i}|} \right].$$

In the aforesaid mathematical equation, $\theta_{1C} = \Delta\theta_{1C}$, $\theta_{2C} = \Delta\theta_{1C} + \Delta\theta_{2C}$, ..., $\theta_{(N-1)C} = \sum_{i=1}^{i=N-1} \Delta\theta_{iC}$. Moreover, $\vec{R_i}$ represents a i-th coordinate vector corresponding to a i-th frame of laser speckle image, and $\overrightarrow{R_{i+1}}$ representing a (i+1)-th coordinate vector corresponding to a (i+1)-th frame of laser speckle image. Therefore, in this precision calibration method, an average rotation radius is measured for calculating included angles between each of two displacement vectors though vector inner product equation, such that the obtained included angle are taken as N number of after-compensation angle coordinates. Thus, by way of replacing the N number of originally-calculated angle coordinates with the N number of after-compensation angle coordinates, the angle coordinates positioning error resulted from the eccentric error can be solved.

The above description is made on embodiments of the present invention. However, the embodiments are not intended to limit scope of the present invention, and all equivalent implementations or alterations within the spirit of the present invention still fall within the scope of the present invention.

What is claimed is:

1. A precision calibration method for being applied in a high-precise rotary encoder system, comprising:
   (1) providing the high-precise rotary encoder system comprising a rotary encoding body having an optical position surface, a laser speckle image capturing module having a 2D image sensor, and a controlling and processing module; wherein the rotary encoding body is connected to a center rotary shaft of a work equipment, and a precision calibration angle being included between the horizontal axis of the 2D image sensor and the horizontal axis of the rotary encoding body;
   (2) making the rotary encoding body continuously rotate by a constant small angle until the rotary encoding body rotates a full circle, and using the laser speckle image capturing module to treat a laser speckle image capturing process to the optical position surface during the rotation of the rotary encoding body, so as to obtain N frames of laser speckle image from the optical position surface and then store the N frames of laser speckle image in a data base of the controlling and processing module;
   (3) using at least one image comparison library comprised by the controlling and processing module to treat a first frame of laser speckle image and a N-th frame of laser speckle image in the N frames of laser speckle image with a key features matching process, so as to calculate an eccentric displacement;
   (4) if the eccentric displacement is less than a position precision of the laser speckle image capturing module, then
   (5) using the at least one image comparison library to treat each of two adjacent frames of laser speckle image in the N frames of laser speckle image with the key features matching process for obtaining a plurality of displacement vectors, and then N number of angle coordinates corresponding to the N frames of laser speckle image being respectively calculated based on the plurality of displacement vectors; otherwise
   (6) calculating an average rotation radius of the rotary encoding body, and then calculating N number of coordinate vectors corresponding to the N frames of laser speckle image; and
   (7) treating each of two adjacent coordinate vectors in the N number of coordinate vectors with an inner product calculation, so as to obtain N number of after-compensation angle coordinates.

2. The precision calibration method of claim 1, wherein when the rotary encoding body is rotated one time by the constant small angle, a circumference displacement of the rotary encoding body must be smaller than 0.5 fold of an image capture range of the 2D image sensor.

3. The precision calibration method of claim 1, wherein the said position precision can be calculated by treating two adjacent frames of laser speckle image having a largest overlap region in the N frames of laser speckle image with the key features matching process.

4. The precision calibration method of claim 1, wherein the image comparison library is SIFT (Scale Invariant Feature Transform) or SURF (Speed Up Robust Feature).

5. The precision calibration method of claim 1, wherein the step (5) further comprises following detail steps:

(51) using the image comparison library to treat each of two adjacent frames of laser speckle image in the N frames of laser speckle image with the key features matching process, so as to obtain the displacement vectors and then store the displacement vectors in the data base; wherein the displacement vectors is treated with a displacement vector transforming process by using an α rotation matrix;

(52) calculating a positioning circumference length based on the displacement vectors;

(53) defining a first angle coordinate corresponding to the first frame of laser speckle image as 0°, and then subsequently calculating all of the other angle coordinates by using following mathematical equation:

$$\theta_{N-1} = \Delta\theta_1 + \Delta\theta_2 + \ldots + \Delta\theta_{N-2} + \Delta\theta_{N-1} = 360° \times \frac{(\Delta R_1 + \ldots + \Delta R_{N-1})}{\Sigma \Delta R};$$

wherein:

$\Sigma \Delta R$ represents the positioning circumference length;

$\Delta\theta_1$ represents a second angle coordinate corresponding to a second frame of laser speckle image;

$\Delta\theta_2$ represents a third angle coordinate corresponding to a third frame of laser speckle image;

$\Delta\theta_{N-1}$ represents a N-th angle coordinate corresponding to the N-th frame of laser speckle image;

$\Delta R_1$ represents the length of a first displacement vector in the plurality of displacement vectors;

$\Delta R_{N-1}$ represents the length of a (N-1)-th displacement vector in the plurality of displacement vectors.

6. The precision calibration method of claim 5, wherein the step (6) further comprises following detail steps:

(61) making the rotary encoding body continuously rotate by the constant small angle until the rotary encoding body rotates totally m full circles, and using the laser speckle image capturing module to capture (N×m) frames of laser speckle image from the optical position surface of the rotary encoding body, and then storing the (N×m) frames of laser speckle image in the data base;

(62) using the image comparison library to treat each of two adjacent frames of laser speckle image in the (N×m) frames of laser speckle image with the key features matching process, so as to obtain (N×m) number of displacement vectors;

(63) using the α rotation matrix to treat the displacement vectors with the displacement vector transforming process;

(64) calculating the average rotation radius of the rotary encoding body by using following mathematical equation:

$$r_{ave} = \frac{\sum_{1}^{N \times m} |\Delta \overrightarrow{R_i}|}{m \times 2\pi};$$

wherein:

$r_{ave}$ represents the average rotation radius;

$\pi$ represents the circumference ratio;

$|\Delta \overrightarrow{R_i}|$ represents the length of a i-th displacement vector in the plurality of displacement vectors.

7. The precision calibration method of claim 6, wherein the α rotation matrix is represented by following mathematical equation:

$$(dx_{encoder,i}, dy_{encoder,i}) = (dx_{Dec,i}, dy_{Dec,i}) \begin{bmatrix} \cos\alpha & -\sin\alpha \\ \sin\alpha & \cos\alpha \end{bmatrix};$$

wherein:

$(dx_{encoder,i}, dy_{encoder,i}) = \Delta \overrightarrow{\phantom{R}}$ represents a small circumferential displacement produced as the rotary encoding body is rotated by the constant small angle;

$(dx_{Dec,i}, dy_{Dec,i}) = \Delta \overrightarrow{R_{Dec,i}}$ represents a small circumferential displacement produced as the rotary encoding body is rotated by the constant small angle;

α represents a small circumferential displacement produced as the rotary encoding body is rotated by the constant small angle.

8. The precision calibration method of claim 1, wherein the step (7) further comprises following detail steps:

(71) defining a first coordinate vector corresponding to the first frame of laser speckle image as $\overrightarrow{R_1} = (x_1, y_1) = (0, r_{ave})$, wherein $r_{ave}$ is the average rotation radius;

(72) using the image comparison library to treat the first frame of laser speckle image and a second frame of laser speckle image in the N frames of laser speckle image with the key features matching process, so as to obtain a second coordinate vector corresponding to the second frame of laser speckle image as $\overrightarrow{R_2} = (x_2, y_2) = (0, r_{ave}) + (dx'_1, dy'_1)$; wherein $(dx'_1, dy'_1) = \Delta \overrightarrow{R_1}$ represents a first displacement vector between the first frame of laser speckle image and the second frame of laser speckle image;

(73) continuously using the image comparison library to treat each of two adjacent frames of laser speckle image in the N frames of laser speckle image with the key features matching process, so as to obtain all of the coordinate vectors represented by $\overrightarrow{R_i} = (x_i, y_i) = (x_{i-1}, y_{i-1}) + (dx'_i, dy'_i)$;

(74) defining the angle coordinate of the first coordinate vector $\overrightarrow{R_1}$ as a first after-compensation angle coordinate, and then subsequently calculating others after-compensation angle coordinates by using following mathematical equation:

$$\Delta\theta_{ic} = \cos^{-1}\left[\frac{\overrightarrow{R_{i+1}} \cdot \overrightarrow{R_i}}{|R_{i+1}| \times |R_i|}\right];$$

wherein $\overrightarrow{R_i}$ represents a i-th coordinate vector corresponding to a i-th frame of laser speckle image, and $\overrightarrow{R_{i+1}}$ representing a (i+1)-th coordinate vector corresponding to a (i+1)-th frame of laser speckle image.

9. The precision calibration method of claim 5, wherein the precision calibration angle is limited by following mathematical equation:

$$\alpha \geq \tan^{-1}\left(\frac{q}{\Sigma \Delta R}\right),$$

wherein q means pixel counts and $\Sigma \Delta R$ represents the positioning circumference length.

10. The precision calibration method of claim 7, wherein the precision calibration angle is calculated by following mathematical equation:

$$\alpha = \frac{\left(\sum_{i=1}^{i=N} \Delta \theta_{Dec,i}\right) - 180°}{N}, \quad \text{wherein } \Delta \theta_{Dec,i} = \tan^{-1}\left(\frac{dy_{Dec,i}}{dx_{Dec,i}}\right).$$

* * * * *